United States Patent [19]

Lucas

[11] 4,231,217
[45] Nov. 4, 1980

[54] LAWN MOWER SAFETY DEVICE

[76] Inventor: Frank J. Lucas, 302 N. Center St., Box 316, LaGrange, Ohio 44050

[21] Appl. No.: 61,360

[22] Filed: Jul. 27, 1979

Related U.S. Application Data

[63] Continuation-in-part of Ser. No. 45,348, Jun. 4, 1979, abandoned.

[51] Int. Cl.³ .............................................. A01D 75/20
[52] U.S. Cl. ...................................... 56/17.4; 56/11.8; 56/295
[58] Field of Search ....................... 56/17.4, 295, 11.8, 56/11.3, 10.5, 10.2, 320.1, 320.2, 17.5

[56] References Cited
U.S. PATENT DOCUMENTS

| | | | |
|---|---|---|---|
| 3,903,679 | 9/1975 | Sorenson et al. | 56/11.8 |
| 4,114,354 | 9/1978 | Morris | 56/295 |

Primary Examiner—Jay N. Eskovitz
Attorney, Agent, or Firm—Paul H. Gallagher

[57] ABSTRACT

The device is applicable to a lawn mower of the rotary type having a rotor on a vertical axis, with cutting blades movable to an outer active position in which they extend radially beyond the rotor, and an inner inactive position in which they are retracted within the rotor; a solenoid is utilized to project the cutting blades to active position, and they are spring-loaded to retract them in inactive position; the solenoid is activated by a switch controlled by the usual manual traction control lever, utilized for throwing the motor into drive condition, so that the cutting blades are moved to active position automatically when the mower is put in drive condition and to inactive position when the mower is stopped; the solenoid is actuated by the magneto of the engine provided in the mower.

7 Claims, 8 Drawing Figures

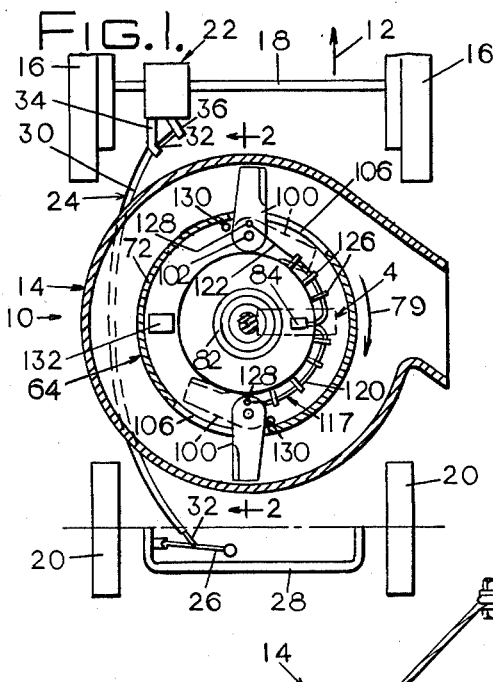

LAWN MOWER SAFETY DEVICE

This application is a continuation-in-part of my prior co-pending application, Ser. No. 045,348, filed June 4, 1979, and now abandoned.

OBJECTS OF THE INVENTION

A general object of the invention is to provide novel safety construction in a rotary lawn mower having a rotor rotatable on a vertical axis, the rotor including cutting blades having an active position radially beyond the rotor, in which are included the following features:

(1) The blades are mounted for controlled movement into an outer active position in which they extend radially beyond the rotor, and an inner inactive position in which they are disposed within the confines of the rotor.

(2) The cutting blades are movable to their active and inactive positions automatically in response to placing the mower in drive condition, and stopped condition, respectively.

(3) The usual manual traction control lever, that is provided in the mower, is utilized, as a direct result of its movement for controlling the mower drive, for controlling the movement of the blades to active and inactive positions.

(4) Novel means is provided for moving the blades to their respective active and inactive positions by an electrically controlled solenoid mounted on the rotor and carried therewith, and a counter weight is also provided on the mower for counter-balancing the solenoid.

(5) The solenoid is controlled by an electric circuit deriving current from the usual magneto provided in lawn mowers of this general type, whereby to add to the safety feature in that whenever the engine is stopped, the cutting blades will be in, and remain in retracted position.

DESCRIPTION OF A PREFERRED EMBODIMENT

In the drawings:

FIG. 1 is a top view of a lawn mower embodying the features of the present invention, being oriented generally according to line 1—1 of FIG. 2, but showing wheels and other appurtenances that are not included in FIG. 2;

FIG. 2 is a vertical sectional view taken at line 2—2 of FIG. 1;

FIG. 3 is a semi-diagrammatic view of the traction control lever provided in the mower, with a control switch operated thereby;

FIG. 4 is a plan view of the area surrounded by dot-dash lines and indicated No. 4, in FIG. 1;

FIG. 5 is a view taken at line 5—5 of FIG. 4;

FIG. 6 is a detail view taken at line 6—6 of FIG. 4;

FIG. 7 is a detail view taken at line 7—7 of FIG. 2, and

FIG. 8 is a diagrammatic view of the component enclosed in dot-dash lines and indicated at 8 in FIG. 2, together with other elements.

Certain of the elements of the various figures of the drawings are of diagrammatic and fragmentary character, since the detail structure of various components may be conventional and known, or the specific detail structure thereof may be indeterminate insofar as the incorporation of the present invention is concerned.

Referring in dtail to the drawings, FIG. 1 shows a lawn mower indicated in its entirety at 10, and arranged for moving forwardly in the direction of the arrow 12. The lawn mower includes a mower proper 14 mounted on front power wheels 16 on an axle 18, and rear wheels 20. The usual clutch/transmission unit 22 is mounted in appropriate place for driving the power wheels 16. The unit 22 is controlled by a motion transmitting means 24 which may be of the well known bowden wire type leading to a traction control lever 26 mounted on the mower handle 28 for manual actuation. The device is applicable to mowers of various general kinds such as push, self-propelled, and riding mowers, the mower 10 in the present instance being of the self-propelled type. The motion transmitting means 24 includes an outer sleeve 30 (see also FIG. 3) and an inner wire 32 slideable in the outer sleeve. The forward end of the sleeve 30 is fixedly mounted in a bracket 34 in the unit 22 and the inner wire element 32 is connected to a movable control element 36 of the unit. At the rear or handle end the outer sleeve 30 is fixedly mounted on a bracket 38 (FIG. 3) which itself is mounted on the mower handle 28 and the inner wire element 32 is secured to the traction control lever 26. In the normal use of the mower, the operator moves the lever 26 forwardly (away from the observer FIGS. 1 and 3) and this movement moves the inner wire element 32 for actuating the power unit 22 for putting the mower in drive condition. This a known arrangement.

Also mounted on the bracket 38 is a switch means 40 shown here diagrammatically (But omitted from FIG. 1), including contact elements 42 from which conductors 44 lead, the contact elements being engaged by a contactor 46 mounted on the lever 26. When the operator moves the lever for putting the mower into drive condition, the switch 40 is simultaneously closed thereby for performing a control operation on the safety device of the mower, constituting the principal feature of the invention, as will be referred to again hereinbelow.

Attention is directed particularly to FIG. 2 showing certain details of the construction of the mower proper 14. The mower proper includes an outer shell or housing 48 having a central conical portion 50 and an annular flat radial portion 52 leading outwardly therefrom. An outer skirt or wall 54 is secured to the flange 52 at the outer edge thereof, extending downwardly and forming an interior space 56. The conical portion 50 has a central opening closed by a plate 58, secured thereto by suitable means such as bolts 60 and the mower engine 62 is mounted on the plate 58.

Mounted within the space 56 is a rotor 64 including a central shell-like or dome-shaped element 66 from the outer edge of which leads a downwardly extending circumferential wall 68, this wall continuing into an outer annular flat floor element 70, and the latter leads into an upwardly extending outer peripheral wall 72, the elements 68, 70, 72 forming an outer annular, upwardly facing channel 74. The rotor 64 is contained entirely within the space 56 of the mower housing, i.e., it does not extend downwardly beyond the wall 54, and preferably terminates upwardly of the lower edge thereof.

The mower engine 62 includes a drive shaft or crank shaft 76 extending downwardly through the plate 58 and the rotor 64 is secured thereto by any suitable means including a securing nut 78. The rotor is driven in clockwise direction, as indicated by the arrow 79.

Mounted on the shaft 76 is a disc 80 of insulating material in which are imbedded a pair of slip rings 82 of conductive material (FIGS. 1, 7 and 8) from which the conductors 44 (see also FIG. 3) lead to the switch contacts 42 in the switch 40. The conductors 44 also lead to a solenoid 84 (FIGS. 4, 5 and 8) utilized for actuating the cutting blades, as described hereinbelow.

Associated with the disc 80 is a contactor unit 86 (FIGS. 2 and 8) which includes a pair of brushes 88 biased into engagement with the respective slip rings 82. Connected with these brushes are conductors 90 leading to the magneto 92 usually provided in such a lawn mower, and the circuit includes other conductors 94 for the ignition of the engine as diagrammatically indicated by the spark plug 96 and under suitable controls 98. Thus the current utilized for moving the cutting blades to active position is provided by the magneto.

The cutting blades are indicated at 100 are two in number, pivoted at their inner ends on pins 102 mounted in the floor element 70 of the channel 74 and secured by suitable means such as locking rings 104. The outer wall 72 is provided with slots 106 through which the blades are swingable between their radially outwardly extending, active position shown in full lines in FIG. 1 and their inner retracted inactive position shown in dot-dash lines in that figure. As will be noted, the cutting blades are moved in counterclockwise direction to active position, and in clockwise direction to inactive position. The controls for moving these cutting blades between their active and inactive positions, is described hereinbelow.

The cutting blades 100 are moved to active position as an adjunct to putting the mower in driving condition, as stated above. The means for directly moving the cutting blades, under the control of the switch 40 includes the solenoid 84, referred to in connection with FIG. 8 and shown in FIGS. 1, 4 and 5. The solenoid includes a body or coil 106 and an armature 108 in the form of an elongated rod, and is supported by a frame 110 of suitable construction mounted on the rotor 64. The solenoid is biased to retracted position by a compression spring 112 biased between an element 114 of the frame and an element 116 on the armature. The armature extends through the frame element 114 and interconnecting the armature and the blades is another motion transmitting means 117 of bowden wire construction including two members 118 each having an outer sleeve 120 and an inner wire element 122. One member leads to each of the cutting blades 100, the inner wire elements 122 of the two members being connected at an inner end to a cross head 124 (FIG. 4) which is directly connected to the armature of the solenoid. As noted above, the solenoid is mounted on the rotor, and it will be understood that the motion transmitting means 117 which interconnects the solenoid and the cutting blades is necessarily also mounted on the rotor. The outer sleeves 120 are mounted in fixed position on the rotor by brackets 126 at closely spaced points therealong, including a first one, 126' (FIGS. 4 and 5) closely adjacent the solenoid; others 126" (FIG. 5) securing the sleeve to the inner wall 68; and still others, 126''' spaced along the floor element 70 of the channel 74. The extended ends of the inner wire elements 122 are connected with pins 128 on the cutter blades. Upon energization of the solenoid 84, the armature 108 is moved to the right (FIGS. 1, 4 and 5) pushing the inner elements 122 of the bowden wire members and thereby swinging the cutting blades 100, both in counter-clockwise direction (FIG. 1) to their full-line active positions, the pins 128 being located at respective positions on the cutting blades to effect movement of the cutting blades in those directions. The cutting blades as indicated above move through the slots 106 in the outer wall 72, and they are limited to their movement by stop pins 130 mounted in the floor element, thus preventing the blades from being thrown against the elements defining the ends of the slots. Other stop pins may be positioned for limiting the movement of the blades in retracting direction. A counter-weight 132 is secured on the rotor 64 to counter-balance the solenoid and motion transmitting means 117.

Although two cutting blades, as shown here, are preferred, it is also within the scope of the invention to utilize three or even four blades and in that case, a motion transmitting means 117 is used for each blade, being interconnected between the blade and the cross head 124 of the solenoid.

In the normal use of the mower, when the mower is stopped, the switch 40 (FIGS. 3 and 8) is open, due to the fact that the traction control lever 126 is in its inactive position which is that shown in FIG. 3. Accordingly, the cutting blades are resting in their inner inactive position and the user can work on the mower, putting his hands in the area within the surrounding skirt 54 without danger of being cut, it being appreciated that the rotor may be rotating at this time if the engine is operating while the mower is standing still. Then when it is desired to use the mower, he controls it in the normal fashion, grasping the handle 28, and moving the traction control lever 26 to active position. This not only puts the mower in drive condition as explained above, but closes the switch 40 also as explained above, and energizes the solenoid 88, projecting the cutting blades to outer active position.

The compression spring 112 (FIGS. 4 and 5) is relatively strong, and although here shown as in direct association with the solenoid itself, it may be placed in any desired position, for performing its intended function, namely, moving the solenoid to retracted position and through the motion control members 118, moving the cutting blades to inactive position, the spring being of sufficient strength to retain the cutting blades in their inactive position. The matter of centrifugal force need not be considered, since when the mower is in stopped position, the engine is idling and the centrifugal force would not then be sufficient to throw the blades out to active position.

A distinct advantage of the apparatus is the utilization of the magneto, this is usually supplied to such a mower, for actuating the solenoid and thus the cutting blades. This eliminates the need for a separate battery, or electric lines from a main or community source of electricity, but the invention is sufficiently broad to cover the latter arrangements if it should be desired to utilize them for any reason.

I claim:

1. In a lawn mower having wheels and an engine for propelling it, the combination comprising,
   a clutch/transmission unit for selectively interconnecting the engine and the wheels,
   manually actuated means for controlling said unit,
   a rotor rotatable on a vertical axis and driven by the engine,
   cutting blades on the rotor and movable between an active position extending radially beyond the rotor and an inactive position within the perimeter of the rotor, and means operably controlled by the manually actuated means for moving the cutting blades to active position.

2. The combination according to claim 1 wherein, the cutting blades are pivotally mounted on the rotor, means is included for biasing the cutting blades to retracted position, and the means for moving the cutting blades to active position is operable for doing so against said biasing means.

3. The combination according to claim 1 wherein, the means for moving the cutting blades to active position includes a solenoid.

4. The combination according to claim 3 wherein, the lawn mower includes a magneto for producing an electric current, and the combination includes a switch controlled by the manually actuated means for energizing the solenoid in response to actuating said unit.

5. The combination according to claim 4 wherein, the lawn mower includes an electric circuit, a first portion of the electric circuit includes the magneto and is incorporated in a stationary portion of the lawn mower, a second portion of the electric circuit includes the solenoid and is mounted on the rotor, and the combination further includes slip rings carried on and rotated by the rotor, and a contactor unit on a stationary part of the lawn mower having contact elements biased into contact engagement with the slip rings.

6. The combination according to claim 3 wherein, the motion transmitting means between the solenoid and cutting means includes bowden wires having inner wire elements interconnected between the solenoid and the cutting blades, and the outer casing connected to fixed portions of the rotor.

7. The combination according to claim 6 wherein, the rotor includes a central dome portion and an outer upwardly facing, annular channel, and the cutting blades are pivotally mounted in that channel on vertical axes, the solenoid is mounted on the central dome portions of the rotor, a counter-weight is also mounted on the rotor in counter-balancing relation to the solenoid and motion transmitting means, and the motion transmitting means includes a pair of bowden wire members connected to the solenoid at a position adjacent the solenoid on the central dome portion and extending down into said annular channel and continuing therealong in respective directions to the corresponding cutting blades.

* * * * *